(Model.)

L. LEBER.
Stock Car.

No. 232,732. Patented Sept. 28, 1880.

WITNESSES:
Chas. Nida
C. Sedgwick

INVENTOR:
L. Leber
BY Munn & Co.
ATTORNEYS.

UNITED STATES PATENT OFFICE.

LORENZ LEBER, OF PACIFIC, MISSOURI.

STOCK-CAR.

SPECIFICATION forming part of Letters Patent No. 232,732, dated September 28, 1880.

Application filed August 16, 1880. (Model.)

*To all whom it may concern:*

Be it known that I, LORENZ LEBER, of Pacific, in the county of Franklin and State of Missouri, have invented a new and useful Improvement in Stock-Cars, of which the following is a specification.

Figure 1:
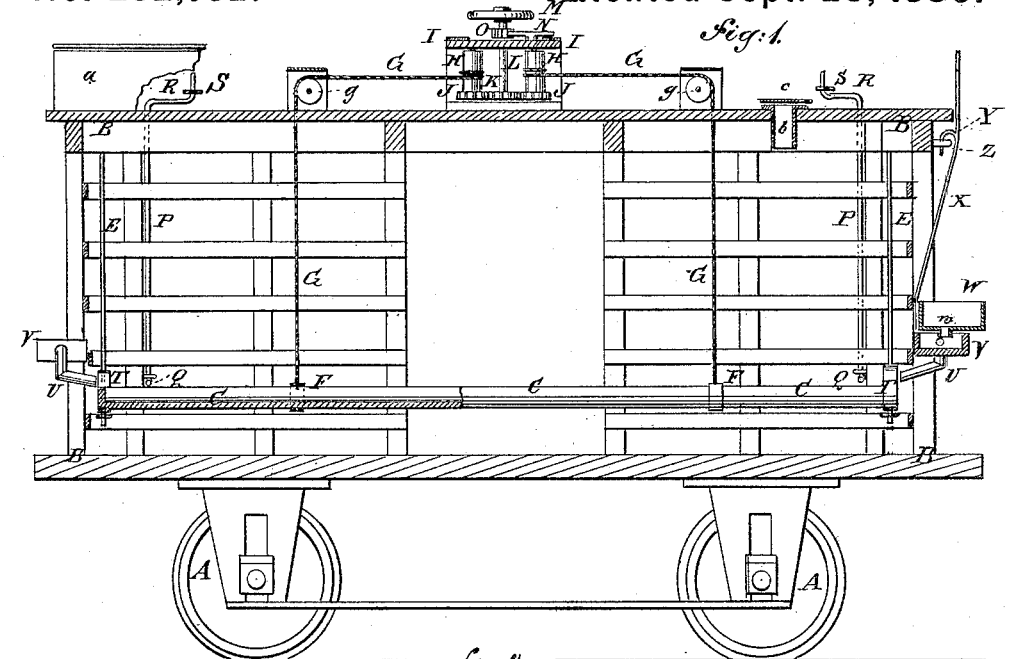
Figure 2:
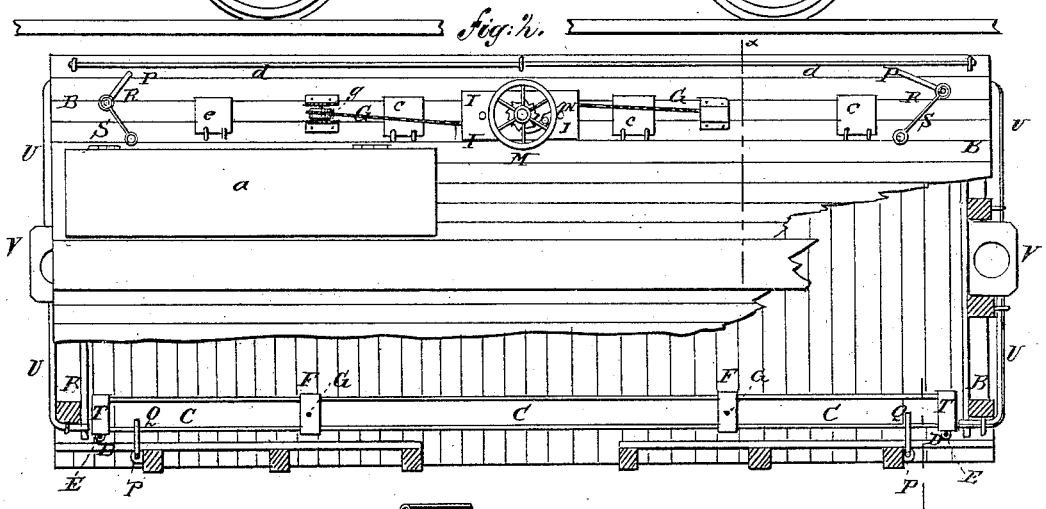
Figure 3:
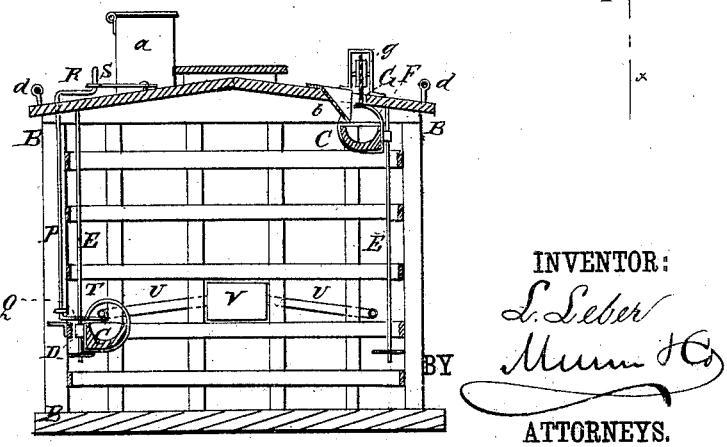

Figure 1 is a sectional side elevation of the improvement. Fig. 2 is a plan view, partly in section. Fig. 3 is a sectional end view taken through the line $x\ x$, Fig. 2.

Similar letters of reference indicate corresponding parts.

The object of this invention is to construct stock-cars in such a manner that stock can be conveniently watered and fed without being removed from the cars.

A represents the wheels, and B the body, of the car, which parts are constructed in the ordinary manner. C are two troughs placed within the car-body B and extending along its sides.

To the outer sides of the end parts of the troughs C are attached tubular keepers D, to receive guide-rods E, to keep the troughs in place as they move up and down. The ends of the rods E are attached to the upper and lower parts of the sides of the car-body B.

To the troughs C, at a distance from their ends equal to about one-fourth their length, are attached bands F, to which are attached the lower ends of chains G. The chains G pass up through holes in the roof of the car-body over pulleys $g$, pivoted to supports attached to the said roof, and their upper ends are attached to short vertical shafts or drums H, pivoted to a frame-work, I, attached to the roof of the car-body B.

To the lower ends of the shafts or drums H are attached, or upon them are formed, gear-wheels J, the teeth of which mesh into the teeth of the gear-wheel K, attached to, or formed upon, the lower end of the shaft L, placed midway between the shafts H, and pivoted to the frame I. The upper end of the shaft L projects above the frame I, and has a hand-wheel, M, attached to its upper end, for convenience in turning it to raise and lower the troughs C.

To the top of the frame I is pivoted a pawl, N, to engage with the teeth of a ratchet-wheel, O, attached to the shaft L, to hold the troughs C securely in any position into which they may be adjusted. The rear ends of the pawls N project so that the said pawls can be thrown into and out of gear by the attendant with his foot.

To the end parts of the frame of the sides of the car-body B are pivoted vertical rods P, which have crank-arms Q, formed upon their lower ends, to be turned across the upper sides of the troughs C when the troughs are lowered into position for use to keep the said troughs from being pushed up by the stock while drinking or eating. Upon the upper ends of the rods P are formed cranks R, for convenience in applying and removing the crank-arms Q.

To the roof of the car-body are pivoted the ends of rods S, in such positions that the eyes at the other ends of the said rods S can be placed upon the cranks R to fasten the rods P in either position.

To the ends of the troughs C are attached bands, covers, or shields T, to prevent the ends of the water-pipes U from being obstructed. The pipes U extend across the ends of the cars, and their outer ends are bent inward and pass through holes in the ends of the car into such positions as to discharge water into the ends of the troughs C, beneath the guards T, when the said troughs have been lowered into position for use. The inner ends of the pipes U are connected with small tubs V, secured to the middle parts of the ends of the car-body B.

W is a receiving-tub, intended to act as a funnel to receive the water from a tank or other reservoir and discharge it into the tubs V. The tub W is placed upon the tub V, and has a short pipe, $w$, in its bottom, through which the water flows into the tub V.

To the inner side of the movable tub W is attached a rod, X, to serve as a handle for removing and carrying the said tub W. Upon the upper part of the handle X is formed a hook, Y, which is hooked into a staple, Z, attached to the upper part of the end of the car-body B, to keep the receiving-tub W in place when upon the tub V. When not in use the receiving-tub W may be carried in a box, $a$, attached to the top of the car-body B, which box may also be used for carrying food for the stock.

In the roof of the car-body B, directly over the troughs, and at suitable distances apart, are formed apertures, in which are secured short spouts $b$, through which food for the stock can be poured into the said troughs when the troughs are raised, the said spouts being at such a distance apart that the food can be spread through the troughs by inserting a hand through the spouts $b$. The spouts $b$ are covered by covers $c$, hinged or otherwise secured to the roof of the car-body.

To the side parts of the roof of the car-body B are attached rods or railings $d$, to serve as a guard to prevent the attendants from falling off the roof.

Having thus described my invention, what I claim as new, and desire to secure by Letters Patent, is—

1. In a stock-car, the combination, with the car-body B and the vertically-sliding troughs C, of the rods P, having crank-arms Q at their lower ends and cranks R at their upper ends, substantially as herein shown and described, whereby the troughs can be secured in place when lowered, as set forth.

2. In a stock-car, the combination, with the roof of the car-body B and the cranks R, of the trough-fastening rods P and the rods S, substantially as herein shown and described, whereby the said trough-fastening rods can be secured in either direction, as set forth.

3. In a stock-car, the combination, with the ends of the troughs C, of the shields T, substantially as herein shown and described, whereby the pipes U are guarded against being obstructed, as set forth.

4. In a stock-car, the combination, with the car-body B and the stationary tub V, having pipes U, of the movable receiving-tub W, having discharge-pipe $w$ in its bottom, and provided with a handle, X, having a hook, Y, and the staple Z, substantially as herein shown and described, whereby water is introduced into the stationary tub V, as set forth.

LORENZ LEBER.

Witnesses:
   JOS. C. LESSANLINE,
   JACOB BUCHER.